Patented Oct. 22, 1929

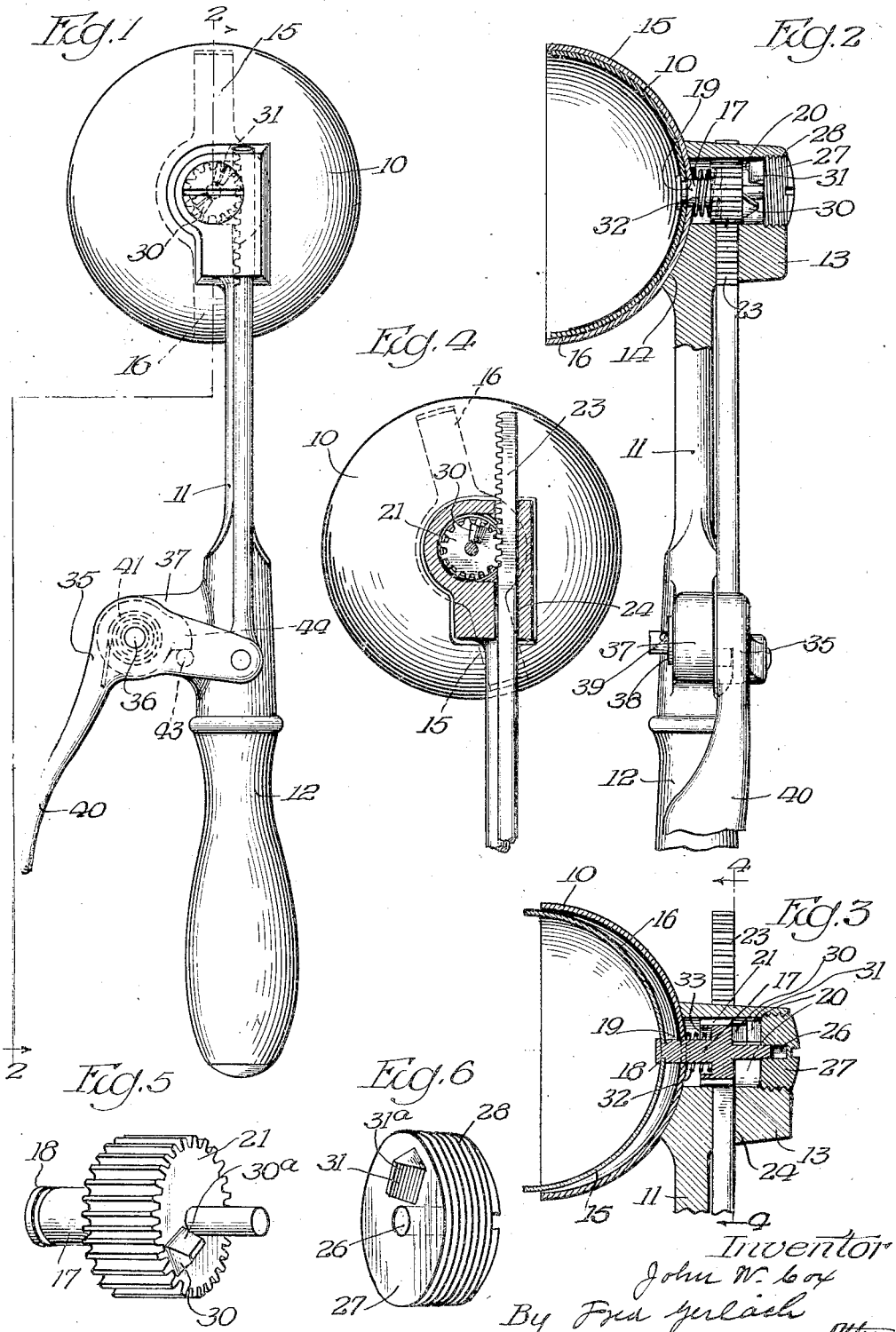

1,732,328

UNITED STATES PATENT OFFICE

JOHN W. COX, OF ERIE, PENNSYLVANIA, ASSIGNOR TO THE GILCHRIST COMPANY, OF NEWARK, NEW JERSEY, A CORPORATION OF NEW JERSEY

ICE-CREAM DISHER

Application filed November 13, 1925. Serial No. 68,755.

The invention relates to ice cream dishers.

In the operation of ice cream dishers of that type which comprises a scraper rotatable in a bowl and on an axis extending through the apex of the bowl, it has been found desirable to insure the separation of the ice cream from the bowl by imparting, besides the rotative shift of the scraper, an axial shift to move the scraper away from the wall of the bowl, and the object of the present invention is to provide a disher of this type in which provision is made for shifting the scraper in the aforementioned manner.

Other objects will appear hereafter from the detailed description.

The invention consists in the several novel features hereinafter set forth and more particularly defined by the claims at the conclusion hereof.

In the drawing: Fig. 1 is an inverted plan of a disher embodying the invention. Fig. 2 is a side elevation of the disher, parts being shown in section, on the line 2—2 of Fig. 1. Fig. 3 is a sectional view, showing the mechanism for shifting the scraper axially, in its operative position. Fig. 4 is a section taken on line 4—4 of Fig. 3. Fig. 5 is a detail perspective of the pinion and shaft for operating the scraper. Fig. 6 is a detail perspective of the plug in which the scraper-operating shaft is mounted.

The invention is exemplified in an ice cream disher comprising a bowl 10 of any suitable form, and a handle-shank 11 which is provided at one end with a handle 12 and at its other end with an integral enlarged portion 13 having a seat 14 in which the bowl 10 is rigidly secured. A scraper, for severing or separating the ice cream from the bowl and comprising a pair of arms or blades 15 and 16 which conform to the inner surface of the bowl, has its central portion fitting across the bottom or the apex of the bowl and has rigidly secured thereto a shaft 17 which is preferably riveted to the scraper, as at 18.

Shaft 17 extends rearwardly through and is slidably mounted in an opening 19 in the apex of the bowl 10 and has its outer end disposed in a chamber 20 which is formed in and extends through the enlarged portion 13 of the shank 11. The central portion of shaft 17 is enlarged and cut to form a pinion or gear 21 which is adapted to mesh with and be rotated by a rack 23 which is slidably mounted in an opening 24 which extends longitudinally through portion 13 and is offset relatively to the apex of bowl 10. The outer end of shaft 17 is reduced and slidably and rotatably mounted in a socket 26 which is formed in a plug 27 which is adapted to close the bottom of chamber 20 and is removably connected to portion 13 by a screw-thread 28.

In practice, it has been found desirable to insure the separation of the ice cream from the bowl by imparting axial movement to the scraper besides the usual rotary movement. The means for accomplishing this axial movement comprises a pair of studs 30 and 31 which are integrally formed with the outer face of pinion 21 and the inner end of plug 27 respectively. These studs have inclined surfaces 30ª and 31ª respectively, which are adapted to coact with each other when the studs are brought into engagement with each other to shift the pinion, shaft, and scraper axially and thus impart an outward movement to the ice cream in the bowl. These studs are disposed at distances a little greater than 180° apart, as shown by dotted lines in Fig. 1, so that they will not engage each other and cause the axial movement of the scraper until after the blades 15 and 16 have completely encircled the inner surface of the bowl. A coil spring 32 is mounted on shaft 17 and has one end abutting against the bowl adjacent opening 19 and at its other end disposed in a socket 33 formed in pinion 21. This spring is adapted to retract the shaft and scraper to their normal position when the studs 30 and 31 are out of engagement.

Rack-bar 23 extends beneath handle-shank 11 and is pivotally connected at its distal end to one end of an angular horizontally disposed finger-lever 35. This lever is removably pivoted by a stud 36 which extends through a laterally offset lug 37 which is integrally formed with handle-shank 11. The stud is provided at its upper end with a washer and a pin for holding the lever in pivoted relation to the handle. The lever comprises a backwardly and outwardly extending finger piece 40. A coil spring 41 is disposed in suitable pockets formed in the contiguous faces of the lever and lug respectively and the pressure of the spring is applied to retract the lever and parts operated thereby including the scraper. A pin 43 extends through handle-shank 11 and is adapted to be engaged by a cooperating stop 44 on the lever to limit the movement of the latter in one direction and causes the lever to be held in its normal position by the spring.

The invention exemplifies an ice cream disher of new and improved construction in which provision is made for shifting the scraper axially relatively to the bowl besides rotating the scraper, so as to insure the separation of the ice cream from the bowl.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an ice cream disher, the combination of a bowl, a handle connected to the bowl, a scraper rotatably mounted in the bowl, means for rotating the scraper comprising a finger lever adjacent the handle, and means independent of said rotating means for shifting the scraper axially away from the bowl.

2. In an ice cream disher, the combination of a bowl, a scraper slidably and rotatably mounted in the bowl, means for rotating the scraper so that it completely encircles the bowl, and means for quickly shifting the scraper away from the bowl substantially at the end of the rotative stroke.

3. In an ice cream disher, the combination of a bowl, a handle connected to the bowl, a scraper slidably and rotatably mounted in the bowl, means for imparting a rotative stroke to the scraper, comprising a finger lever adjacent the handle, and means for shifting the scraper axially away from the bowl substantially at the end of the rotative stroke.

4. In an ice cream disher, the combination of a bowl, a scraper slidably and rotatably mounted in the bowl, means for rotating the scraper a predetermined distance in one direction, means for shifting the scraper axially away from the bowl substantially at the end of the rotative stroke, and spring means operative to shift the scraper axially toward the bowl when said scraper is rotated in the opposite direction and returned to its normal or starting position.

5. In an ice cream disher, the combination of a bowl, a handle connected to the bowl, a scraper rotatably mounted in the bowl, means for rotating the scraper a predetermined distance in one direction, comprising a finger lever adjacent the handle, means for shifting the scraper axially away from the bowl, and spring means for returning the scraper to its normal position.

6. In an ice cream disher, the combination of a bowl, a handle connected to the bowl, a scraper adapted to rotate in the bowl, a shaft for the scraper extending through the apex of the bowl, a pinion on the shaft, means for rotating the pinion to rotate the shaft and scraper, comprising a finger lever adjacent the handle and a rack, and means for shifting the shaft and scraper axially during rotation thereof.

7. In an ice cream disher, the combination of a bowl, a scraper adapted to rotate in the bowl, a shaft for the scraper extending through the apex of the bowl, a pinion rigidly secured to the shaft, means for rotating the pinion to rotate the shaft and scraper, and means for shifting the pinion axially to shift the shaft and scraper away from the bowl.

8. In an ice cream disher, the combination of a bowl, a scraper adapted to rotate in the bowl, a shaft for the scraper extending through the apex of the bowl, a pinion on the shaft, means for rotating the pinion to rotate the shaft and scraper, means for shifting the scraper axially away from the bowl, and a spring between the bowl and the pinion for returning the scraper to the bowl.

9. In an ice cream disher, the combination of a shank having an enlarged member at one end thereof, said member having a seat and a chamber, a bowl secured to said seat, a scraper adapted to rotate in the bowl, a shaft for the scraper extending through the apex of the bowl and into said chamber, means for rotating the shaft and scraper, and means in said chamber for shifting the shaft and scraper axially.

10. In an ice cream disher, the combination of a bowl, a handle connected to the bowl, a scraper rotatably mounted in the bowl, means for rotating the scraper comprising a finger lever adjacent the handle, and means for shifting the scraper axially away from the bowl comprising a pair of members, one of said members having an inclined surface.

11. In an ice cream disher, the combination of a bowl, a scraper rotatably mounted in the bowl, means for rotating the scraper, and means for shifting the scraper axially away from the bowl comprising studs having coacting inclined surfaces.

12. In an ice cream disher, the combination of a bowl, a scraper rotatably mounted in the bowl, means for rotating the scraper, and a pair of studs, one of said studs being connected to the scraper and adapted during rotation of the latter to contact with the other stud and be shifted thereby to shift the scraper axially.

Signed at Erie, Pennsylvania, this 6th day of November, 1925.

JOHN W. COX.